US012726080B2

(12) United States Patent
Yang et al.

(10) Patent No.: US 12,726,080 B2
(45) Date of Patent: Sep. 1, 2026

(54) ELECTRIC MOTOR WITH AIRGAP AND STATOR SLOT COOLING

(71) Applicant: GM GLOBAL TECHNOLOGY OPERATIONS LLC, Detroit, MI (US)

(72) Inventors: Xiaofeng Yang, Troy, MI (US); Alireza Fatemi, Canton, MI (US); Derek F. Lahr, Ann Arbor, MI (US); Peng Peng, Columbus, OH (US)

(73) Assignee: GM Global Technology Operations LLC, Detroit, MI (US)

( * ) Notice: Subject to any disclaimer, the term of this patent is extended or adjusted under 35 U.S.C. 154(b) by 284 days.

(21) Appl. No.: 18/588,575

(22) Filed: Feb. 27, 2024

(65) Prior Publication Data

US 2025/0274013 A1 Aug. 28, 2025

(51) Int. Cl.
*H02K 9/19* (2006.01)
*H02K 1/20* (2006.01)
*H02K 1/32* (2006.01)

(52) U.S. Cl.
CPC ................. *H02K 9/19* (2013.01); *H02K 1/20* (2013.01); *H02K 1/32* (2013.01)

(58) Field of Classification Search
CPC ............... H02K 9/19; H02K 1/20; H02K 1/32
See application file for complete search history.

(56) References Cited

U.S. PATENT DOCUMENTS 11,387,712 B2 7/2022 Lahr et al.
11,418,071 B2 8/2022 Tabuchi et al.
2007/0194638 A1 8/2007 Birdi et al.
2019/0260248 A1* 8/2019 Noda ....................... H02K 1/32
2020/0235620 A1* 7/2020 Matsumoto .............. H02K 1/32
2020/0287432 A1* 9/2020 Tanaka ................... H02K 1/278
2021/0242729 A1* 8/2021 Tabuchi ................... H02K 1/32
2023/0261536 A1* 8/2023 Vanhee .................... H02K 7/04 310/54
2024/0380279 A1* 11/2024 Yang ........................ H02K 9/12

FOREIGN PATENT DOCUMENTS

DE 102010038529 A1 2/2012
JP 2008067466 A 3/2008
JP 2014230408 A 12/2014
JP 2021121144 A * 8/2021

* cited by examiner

*Primary Examiner* — Thomas Truong
(74) *Attorney, Agent, or Firm* — Quinn IP Law

(57) ABSTRACT

An electric motor includes a stator having windings disposed within winding slots. The stator includes a radially inner stator core surface, a radially outer stator surface, and at least one stator passage extending radially a first distance from the inner stator core surface. A rotor is mounted inside the stator and includes at least one fluid passage extending radially through the rotor to the radially outer rotor surface. A fluid circulation arrangement is configured to receive a first liquid via a first passage and a gas via at least one second passage, and direct the first liquid and the gas, via centrifugal force, into the airgap and the at least one stator passage as the rotor rotates inside the stator to discharge the first liquid and the gas out through the airgap and the at least one stator passage radially, and through the windings axially, thereby cooling the electric motor.

20 Claims, 10 Drawing Sheets

66
72
70
68
30
34A
40
36
52
50
46-1
30-1,50-1
50-2
48

34B
34B(III)
34B(II)
34B(I)

30
34B
34
33A
33A
30
34A
33
40

ELECTRIC MOTOR WITH AIRGAP AND STATOR SLOT COOLING

INTRODUCTION

The disclosure relates to an electric motor with airgap and stator slot cooling.

An electric motor is a machine that converts electric energy, i.e., electrical current into mechanical energy, i.e., mechanical torque. Electric motors are classified into two categories based on the direction of the magnetic field, i.e., axial flux motors and radial flux motors, each of which may be configured as an alternating current (AC) or a direct current (DC) type.

Radial flux motors include a rotor mounted within a stator having winding slots including windings. Each winding is formed by connecting a plurality of coils in series. The electric motor operates to generate torque based on an electromagnetic interaction between permanent magnets and a magnetic field created when coils within the electric motor are selectively energized.

As a byproduct of torque generation, electric motors produce thermal energy that may adversely affect motor performance and reliability. Cooling of the electric motor may reduce thermal stress seen, for example, by the rotor, stator, motor poles, windings and/or end-turns, providing longer motor life under or close to peak load. Additionally, electric motor cooling may generally quiet motor operation and enhance motor operation at higher speeds, as well as facilitate reduced motor inertia and packaging.

SUMMARY

An electric motor including a stator having windings disposed within winding slots, a rotor mounted inside the stator, and a fluid circulation arrangement is disclosed. The stator may include a radially inner stator core surface and a radially outer stator surface. The stator may further include at least one stator passage extending radially a first distance from the inner stator core surface.

The rotor mounted inside the stator defines a rotational axis, and may include axially opposite rotor ends and a radially outer rotor surface positioned proximate the radially inner stator surface, thereby establishing an airgap therebetween. The rotor may further include at least one fluid passage extending radially through the rotor to the radially outer rotor surface.

The fluid circulation arrangement may be configured to receive a first liquid via a first passage and a gas via at least one second passage, and direct the first liquid and the gas, via centrifugal force, into the airgap and the at least one stator passage as the rotor rotates inside the stator to discharge the first liquid and the gas out through the airgap and the at least one stator passage radially, and through the windings axially, thereby cooling the electric motor.

The at least one stator passage may extend a second distance from the inner stator core surface to an opening in the radially outer stator surface, the second distance greater than the first distance.

The fluid circulation arrangement may be configured to receive a second liquid through the opening in the radially outer stator surface via the at least one stator passage. The fluid circulation arrangement may further include a rotor shaft positioned coaxially with the rotor, fixed to the rotor, and may define the first shaft passage.

According to one aspect of the disclosure, the rotor shaft may define the at least one second passage.

According to another aspect of the disclosure, the first passage may include the stator passage, and the rotor may define the at least one second passage.

According to another aspect of the disclosure, the first passage may include the stator passage, and the at least one second passage may be disposed between the rotor, and a rotor shaft may be positioned coaxially with the rotor and fixed to the rotor.

The first passage may include the stator passage, and the rotor shaft defines the at least one second passage.

A stator ring may be disposed in the stator passage.

The stator may further include stator teeth that extend radially from the inner stator core surface and alternate with the winding slots circumferentially along a channel portion of the stator. The stator teeth within the stator passage may have a tapered configuration.

The stator teeth within the stator passage may be narrower than the stator teeth not within the stator passage.

The stator may further include stator teeth that extend radially from the inner stator core surface and alternate with the winding slots circumferentially along a channel portion of the stator. The stator teeth within the stator passage may be removed.

According to another aspect of the disclosure, an electric motor may include a stator including windings disposed within winding slots, a rotor mounted inside the stator, and a fluid circulation arrangement.

The stator may include a radially inner stator core surface and a radially outer stator surface. The stator may further include at least one stator passage extending radially a first distance from the inner stator core surface.

The rotor mounted inside the stator, defining a rotational axis, may include axially opposite rotor ends and a radially outer rotor surface positioned proximate the radially inner stator surface, thereby establishing an airgap therebetween. The rotor may further include at least one fluid passage extending radially through the rotor to the radially outer rotor surface.

The fluid circulation arrangement may be configured to receive a first liquid via a first passage and a gas via at least one second passage, and direct the first liquid and the gas, via centrifugal force, into the airgap and the at least one stator passage as the rotor rotates inside the stator to discharge the first liquid and the gas out through the airgap and the at least one stator passage radially, and through the windings axially, thereby cooling the electric motor.

The fluid circulation arrangement may further include a rotor impeller defining the plurality of fluid channels, wherein the radially outer rotor surface may define circumferentially distributed apertures fluidly connected to the respective plurality of fluid channels.

The rotor impeller may be arranged along the rotational axis centrally within the rotor.

The rotor may be a three-piece structure, and may include a first lateral rotor portion and a second lateral rotor, wherein the rotor impeller is may be disposed adjacent to both the first lateral rotor portion and the second lateral rotor portion.

A motor vehicle having such an electric motor as described above is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
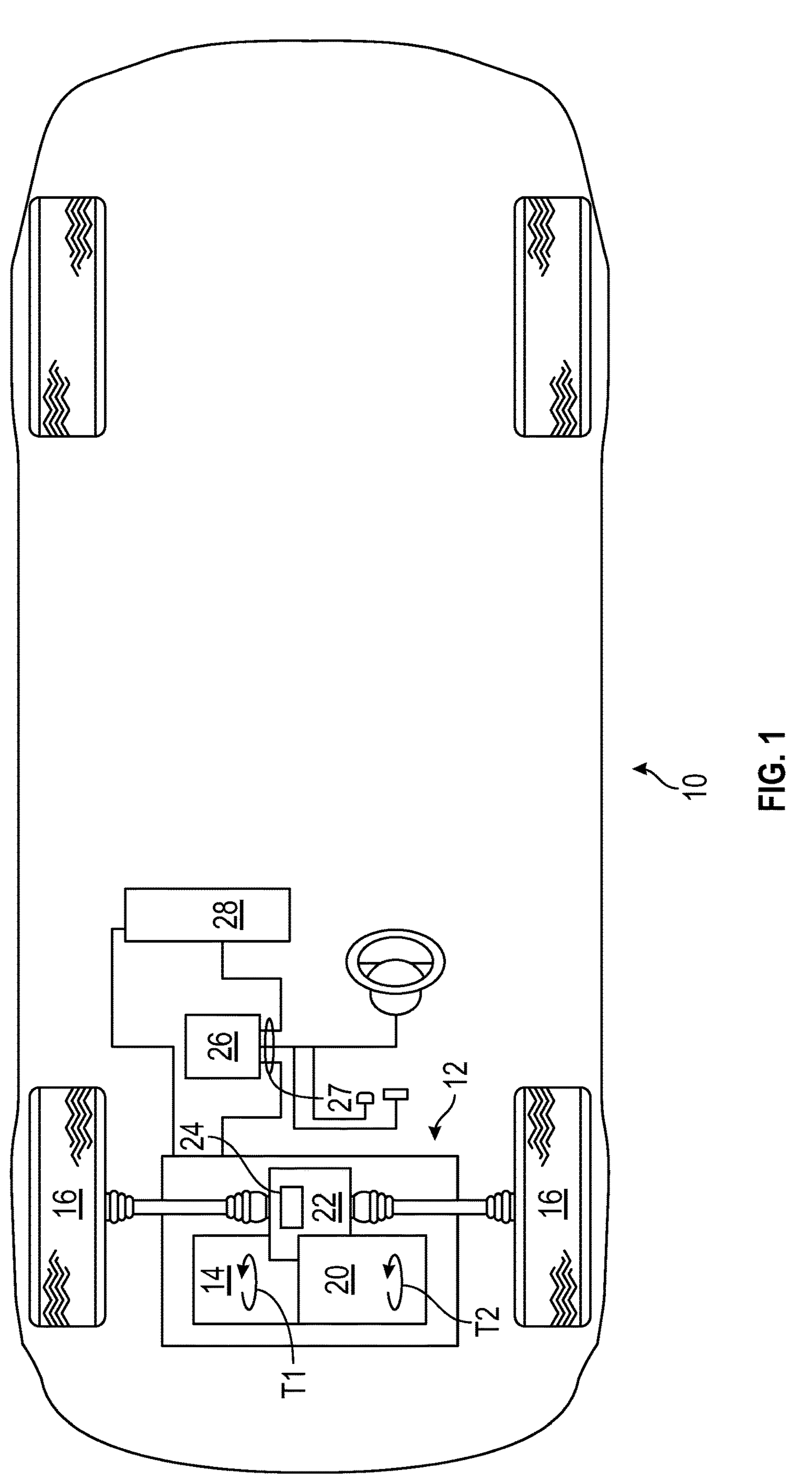
FIG. 1 is a schematic illustration of a motor vehicle having a powertrain employing an electric motor-generator for propulsion.

Embodiments of the present disclosure as described herein are intended to serve as examples. Other embodiments may take various and alternative forms. Additionally, the drawings are generally schematic and not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Certain terminology may be used in the following description for the purpose of reference only, and thus are not intended to be limiting. For example, terms such as “above” and “below” refer to directions in the drawings to which reference is made. Terms such as “front”, “back”, “fore”, “aft”, “left”, “right”, “rear”, “side”, “upward”, “downward”, “top”, and “bottom”, etc., describe the orientation and/or location of portions of the components or elements within a consistent but arbitrary frame of reference, which is made clear by reference to the text and the associated drawings describing the components or elements under discussion.

Furthermore, terms such as “first”, “second”, “third”, and so on may be used to describe separate components. Such terminology may include the words specifically mentioned above, derivatives thereof, and words of similar import, and are used descriptively for the figures, and do not represent limitations on the scope of the disclosure, as defined by the appended claims. Moreover, the teachings may be described herein in terms of functional and/or logical block components and/or various processing steps. It should be realized that such block components may include a number of hardware, software, and/or firmware components configured to perform the specified functions.

Referring to FIG. 1, a motor vehicle 10 having a powertrain 12 is illustrated. The motor vehicle 10 may include, but not be limited to, a commercial vehicle, industrial vehicle, passenger vehicle, aircraft, watercraft, train or the like. It is also contemplated that the motor vehicle 10 may be a mobile platform, such as an airplane, all-terrain vehicle (ATV), boat, personal movement apparatus, robot, and the like to accomplish the purposes of this disclosure. The powertrain 12 includes a first power-source 14 depicted as an electric motor-generator and configured to generate a first power-source torque $T_1$ for propulsion of the motor vehicle 10 via driven wheels 16 relative to a road surface.

The electric motor-generator 14 may be configured as a radial flux electric motor, wherein the magnetic flux is generated perpendicular to the motor’s axis of rotation and an airgap between the machine’s rotor and stator is arranged concentrically with the rotational axis.

As further illustrated in FIG. 1, the powertrain 12 may also include a second power-source 20, such as an internal combustion engine configured to generate a second power-source torque $T_2$. The power-sources 14 and 20 may act individually and/or in concert to power the motor vehicle 10 and be operatively connected to a transmission assembly 22.

The transmission assembly 22 may be configured to transmit first and/or second power-source torques $T_1$, $T_2$ to a final drive unit 24, which in turn may be connected to the driven wheels 16. The first power-source 14, which for the remainder of the present disclosure will be referred to as an electric motor-generator, may be, for example, mounted to the second power-source 20, mounted to (or incorporated into) the transmission assembly 22, mounted to the final drive unit 24, or be a stand-alone assembly mounted to the structure of the vehicle 10.

As illustrated, the motor vehicle 10 further includes a programmable electronic controller 26 configured to communicate via a high-voltage BUS 27 and control the powertrain 12 to generate a predetermined amount of power-source torque (sum of $T_1$ and $T_2$), and various other vehicle systems. The motor vehicle 10 further includes a rechargeable energy storage system (RESS) 28, such as one or more batteries, configured to generate and store electrical energy for powering the power-sources 14 and 20.

Figure 2:
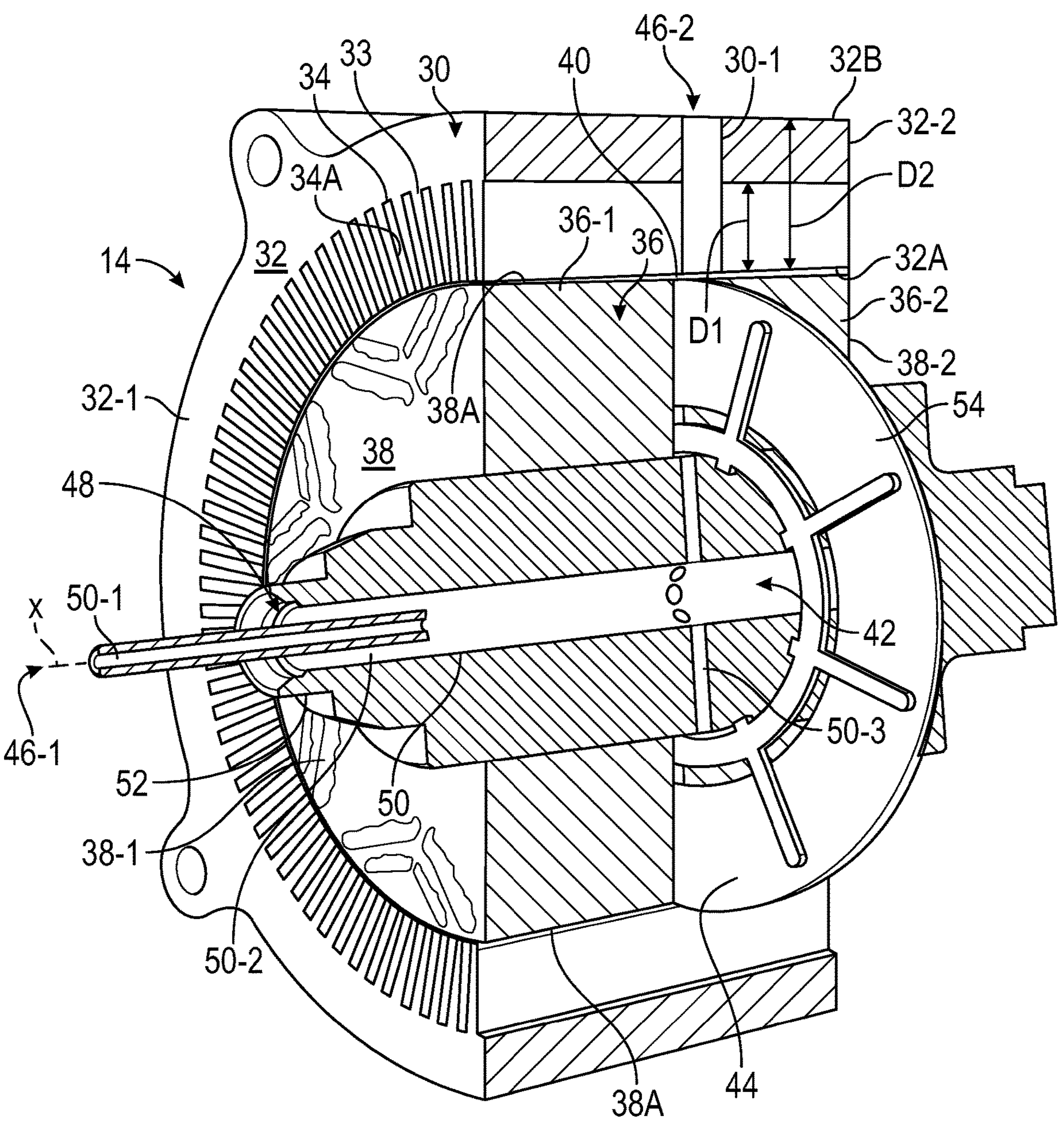
FIG. 2 is a schematic partial cut-away perspective view of an electric motor-generator including a fluid circulation arrangement, according to one aspect of the disclosure.

Referring now to FIG. 2, a general cross-section of the electric motor-generator 14 includes a rotationally fixed stator 30, a rotor 36, and a rotor shaft 52. The stator 30 has a generally cylindrical core 32 including stator teeth 33, and winding slots 34. The stator core 32 has a radially inner stator core surface 32A, a radially outer stator surface 32B, and includes stator teeth 33 and winding slots 34 both of which extend radially outward from and alternate along the radially inner stator core surface 32A.

The rotor 36 defines a rotational axis X and is mounted for rotation inside the stator 30. The stator 30 may include multiphase AC windings 34A arranged within the winding slots 34, wherein the windings receive multiphase AC from a power inverter (not shown) to establish a rotating magnetic field exerting torque upon the rotor 36. The stator windings 34A are generally contained within the winding slots 34 with end turns 34C of the windings 34A extending beyond the limits of the cylindrical core 32 at axially opposite stator ends—a first end 32-1 and a second end 32-2 (FIG. 3).

The rotor 36 has a ferromagnetic rotor core 38. The rotor core 38 has axially opposite rotor core ends—a first end 38-1 and a second end 38-2. The rotor core 38 may be constructed from a relatively soft magnetic material, such as laminated silicon steel. In a permanent magnet machine, stacked rotor laminations may include voids forming interior pockets for carrying permanent magnets. In an induction machine, stacked laminations may include peripheral slots for carrying conduction bars. Alternative rotor constructions are also used in the industry and may include, for example, surface mounted permanent magnet and wire wound rotors. The rotor core 38 has a radially outer rotor surface 38A positioned proximate the radially inner stator core surface 32A, thereby establishing an airgap 40 therebetween (shown in FIGS. 2-4). The airgap 40 extends between the axially opposite first end 38-1 and second end 38-2 of the rotor core.

Figure 3:
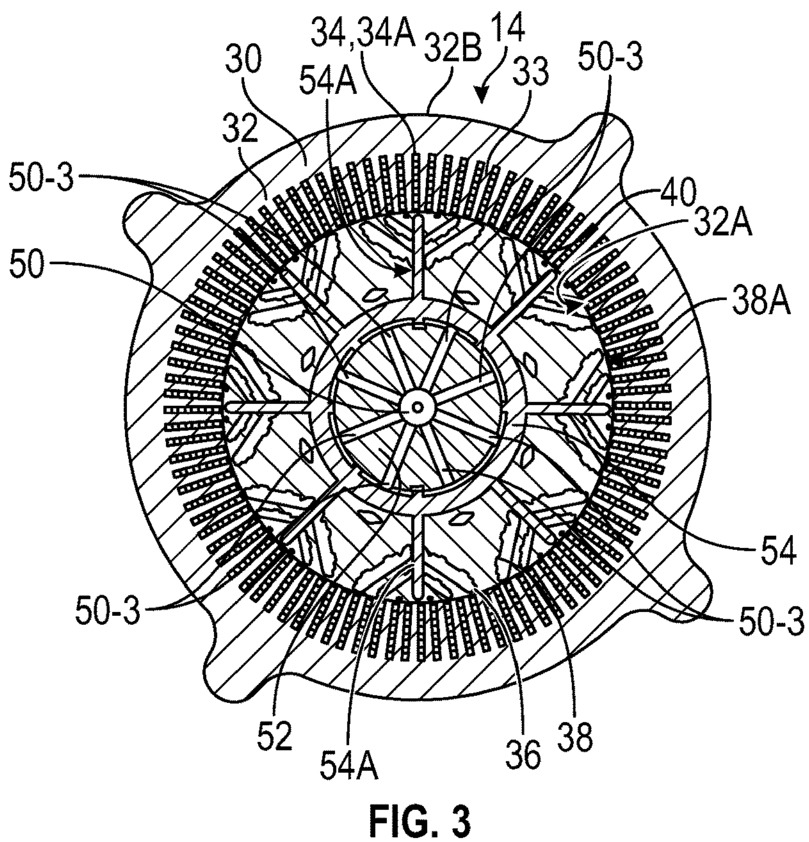
FIG. 3 is a schematic cross-sectional front view illustration of an electric-motor generator, according to the disclosure.
Figure 4:
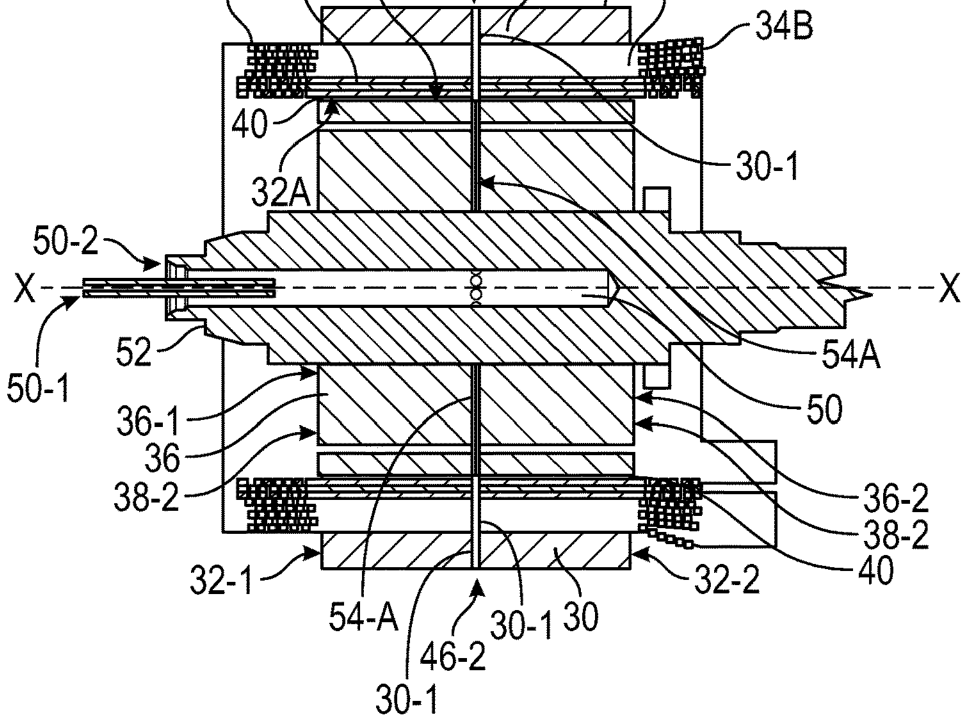
FIG. 4 is a schematic cross-sectional side view illustration of an electric-motor generator, according to the disclosure.

As illustrated in FIGS. 2-4, the rotor 36 further includes a fluid circulation arrangement 42 having one or more fluid channels 44, each extending radially through the rotor to the radially outer rotor surface 38A. The fluid circulation arrangement 42 is configured to receive a first liquid 46-1 via a first passage 50-1 and a gas 48 via one or more second passages 50-2 along the rotational axis X. Specifically, the first liquid 46-1 may be a pressurized oil and the gas 48 may be air. The fluid circulation arrangement 42 is further configured to direct the first liquid 46-1 and the gas 48, via centrifugal force, into the airgap 40 as the rotor 36 rotates inside the stator 30 to discharge the first liquid 46-1 and the gas 48 out of the airgap 40 at the axially opposite ends 38-1, 38-2 of rotor 36. The fluid circulation arrangement 42 is thereby configured to cool the electric motor-generator 14.

Figure 5:
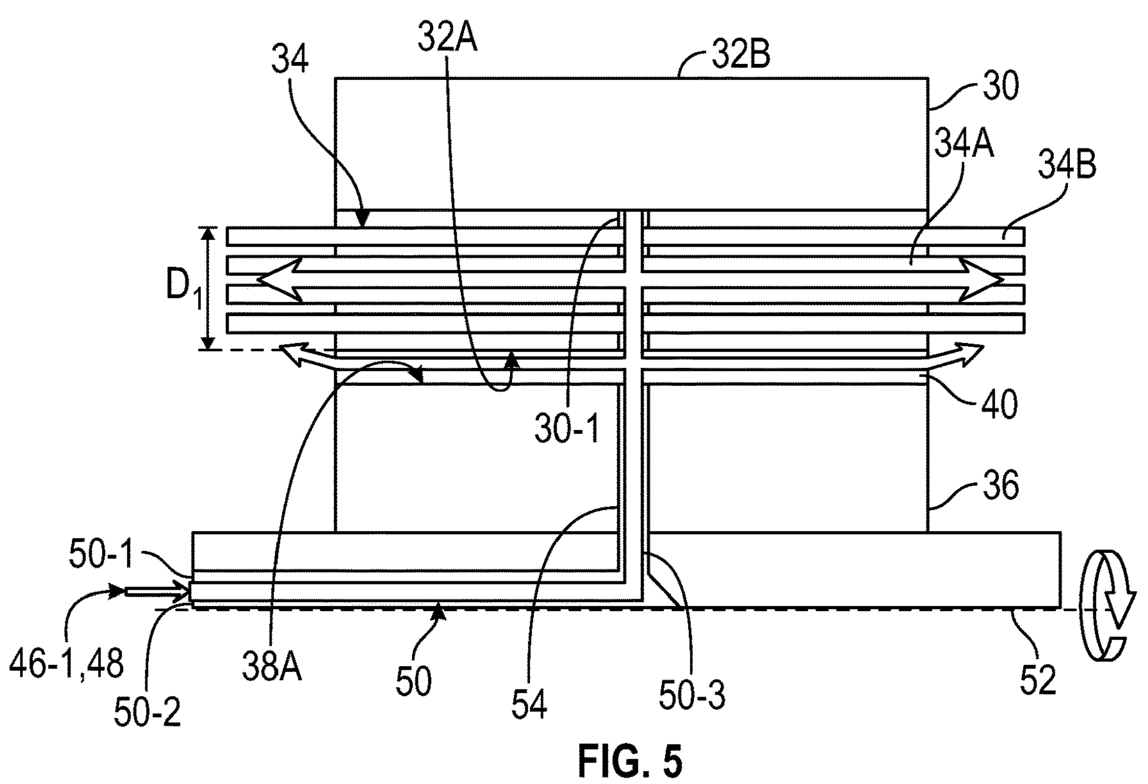
FIG. 5 is a schematic cut-away sectional illustration of an electric-motor generator including a stator passage, according to one aspect of the disclosure.

The rotor shaft 52 is positioned coaxially with the rotor 36. The rotor shaft 52 may be fixed to the rotor 36 and define a passage 50 including the first passage 50-1 for supplying the liquid 46 to the fluid channel(s) 44. Specifically, the first passage 50-1 may be arranged along the rotational axis X and be configured to receive pressurized first liquid 46-1 from one end of the rotor shaft 52. From the first passage 50-1, the first liquid 46-1 may flow through liquid inlets configured as one or more third passages 50-3 into the internal rotor fluid channels 44. As shown in FIGS. 2, 3, and 5, the third passage(s) 50-3 may be cross-drilled holes arranged substantially perpendicular to the first passage 50-1. As the radial flux motor-generator 14 generates the first power-source torque $T_1$, the rotor shaft 52 spins about the axis of rotation X together with the rotor 36. The rotor shaft 52 may be rotatably supported at both rotor core 38 ends (the first end 38-1 and the second end 38-2) by bearings (not shown) and may transfer the first power-source torque $T_1$ generated by the rotor 36 to the driven wheels 16 via the transmission assembly 22 (shown in FIG. 1).

The passage 50 further defines the second passage 50-2 for supplying the gas 48 to the fluid channel(s) 44. Alternatively, the rotor 36 may define the second passage(s) 50-2 (not shown). In the illustrated example, the second passage(s) 50-2 may be arranged substantially parallel to the rotational axis X. The gas 48 may be drawn into the second passage 50-2 by the rotation of the rotor 36, with a vacuum generated in the second passage resulting from the communication of the second passage with the radially disposed fluid channel(s) 44. As illustrated in FIG. 2, the first and second passages 50-1, 50-2 are in fluid communication with each of the fluid channels 44 in the fluid circulation arrangement 42. The first liquid 46-1 and gas 48 may therefore be combined within the fluid channel(s) 44 thereby establishing a two-phase mixture subsequently injected into the airgap 40.

According to one aspect of the disclosure, the fluid circulation arrangement 42 further includes a rotor impeller 54 having a plurality of blades 54A defining a plurality of fluid channels 44. The rotor impeller 54 is arranged perpendicular to the rotational axis X and fixed centrally within the rotor 36. As shown in FIG. 2, the plurality of fluid channels 44 define a radially disposed channel pattern of the rotor impeller 54. As illustrated in FIG. 3, the channels 44 extend through the rotor impeller 54 to the radially outer rotor surface 38A. As such, the rotor 36 includes a three-piece structure (shown in FIGS. 2-4), including a first lateral rotor portion 36-1, a second lateral rotor portion 36-2 and the rotor impeller 54 disposed adjacent to both the first lateral rotor portion 36-1 and the second lateral rotor portion 36-2.

According to one aspect of the present disclosure, as illustrated in FIG. 5 with continued reference to FIGS. 2-4, the stator 30 further includes a stator passage 30-1 that extends radially outward from the radially inner stator core surface 32A a first distance $D_1$. The fluid circulation arrangement 42 is configured to receive the first liquid 46-1 via the first passage 50-1 and the gas 48 via the second passage 50-2, and direct the first liquid 46-1 and the gas 48, via centrifugal force, into the airgap 40 and the at least one stator passage 30-1 extending the first distance $D_1$, as the rotor 36 rotates inside the stator 30 to discharge the first liquid 46-1 and the gas out through the airgap 40 and the at least one stator passage 30-1 radially, and through the windings 34A axially, thereby cooling the electric motor 14.

Figure 6:
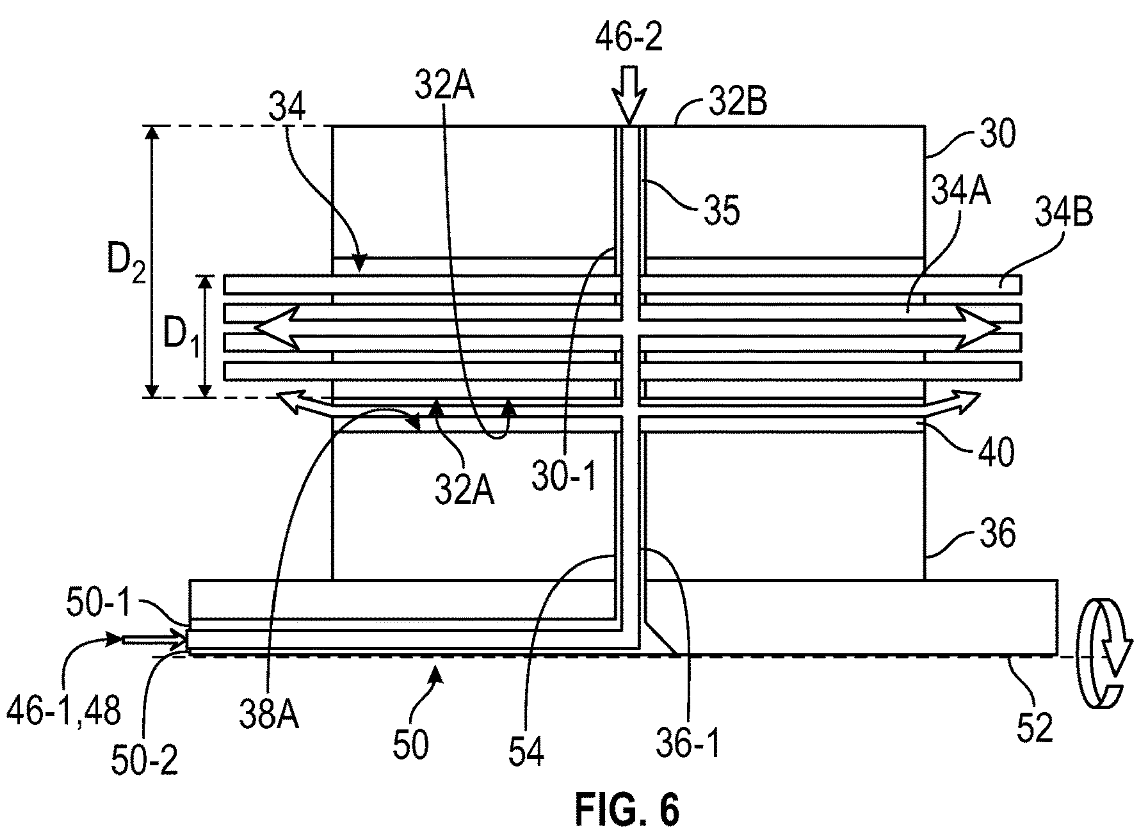
FIG. 6 is a schematic cut-away sectional illustration of an electric-motor generator including another stator passage, according to one aspect of the disclosure.

According to another aspect of the disclosure, as illustrated in FIG. 6 with continued reference to FIGS. 2-4, the stator 20 further includes a stator passage 30-1 that extends radially outward from the radially inner stator core surface 32A a second distance $D_2$ to an opening 35 in the radially outer stator surface 32B. The fluid circulation arrangement 42 is configured to receive the first liquid 46-1 via the first passage 50-1 and the gas 48 via the second passage 50-2, and a second liquid 46-2 via the stator passage 30-1 through the opening 35 in the radially outer stator surface 32B of the stator 30.

The fluid circulation arrangement 42 is configured to direct the first liquid 46-1, the second liquid 46-2, and the gas 48, via centrifugal force, into the airgap 40 and the at least one stator passage 30-1, and further configured to direct the second liquid 46-2, via centrifugal force, through the at least one stator passage 30-1 as the rotor 36 rotates inside the stator 30 to discharge the first liquid 46-1, the second liquid 46-2, and the gas out through the airgap 40 and the at least one stator passage 30-1 radially, and through the windings 34A axially, thereby cooling the electric motor 14.

Figure 7A:
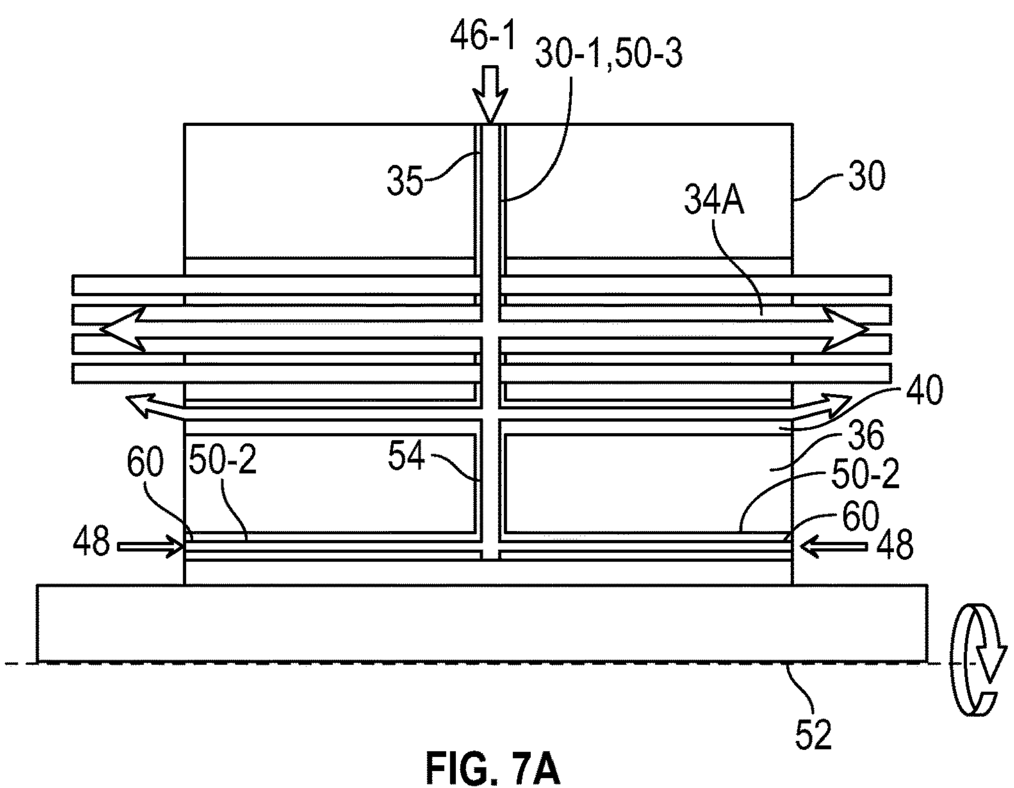
FIG. 7A is a schematic cut-away section illustration of an electric-motor generator, according to another aspect of the disclosure.

According to another aspect of the disclosure, as illustrated in FIG. 7A, the first passage 50-1 includes the stator passage 30-1, and the rotor 36 defines the second passages 50-2. i.e., the second passages 50-2 are disposed within the rotor 36. One feature of this configuration is that the second passages 50-2 avoids the blockage of air flow during large oil flow rates such that the second passage 50-2 is for the flow of air and not oil.

Figure 7B:
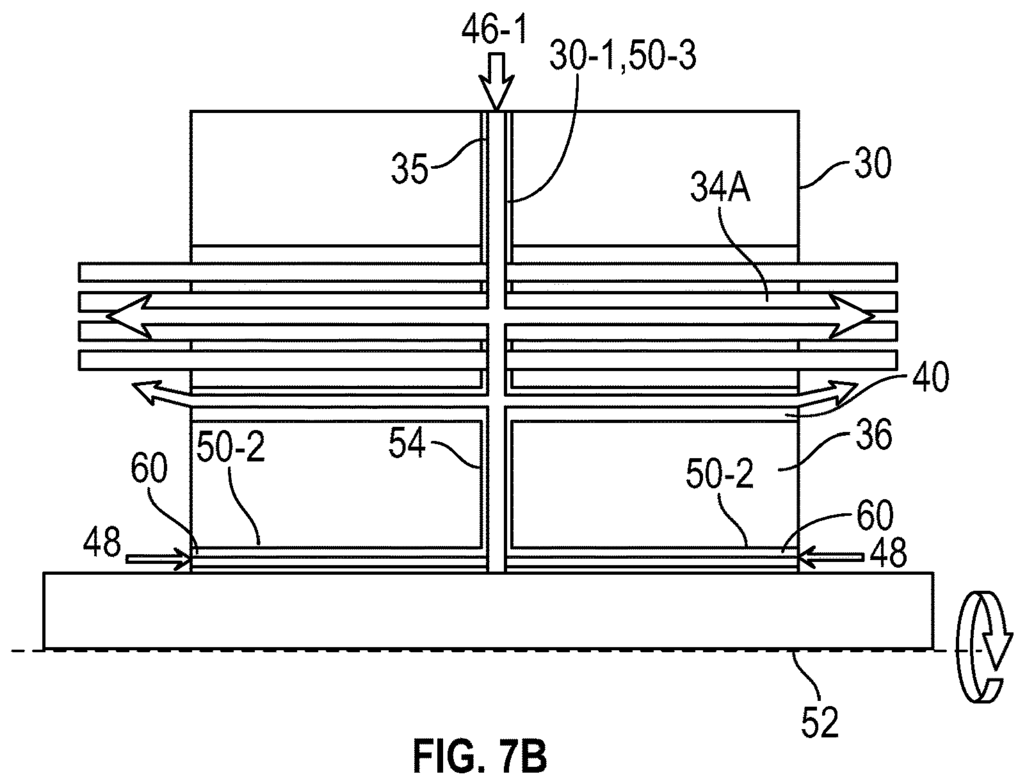
FIG. 7B is a schematic cut-away section illustration of an electric-motor generator, according to another aspect of the disclosure.

According to another aspect of the disclosure, as illustrated in FIG. 7B, the first passage 50-1 includes the stator passage 30-1, and the second passages 50-2 are disposed between the rotor 36 and the rotor shaft 52 positioned coaxially with the rotor 36 and fixed to the rotor 36. One feature of this configuration is that the second passages 50-2 are closer to the rotor shaft 52 there will be a larger centrifugal force and pump more air into the airgap.

As illustrated in both FIGS. 7A and 7B, the first liquid 46-1, for example, an oil, is pumped in through an oil inlet (opening 35) in the stator 30 into the stator passage 30-1, and the gas 48 is pumped in through air inlets 60. As such, the gas 48 is separate from the liquid 46-1.

Figure 8:
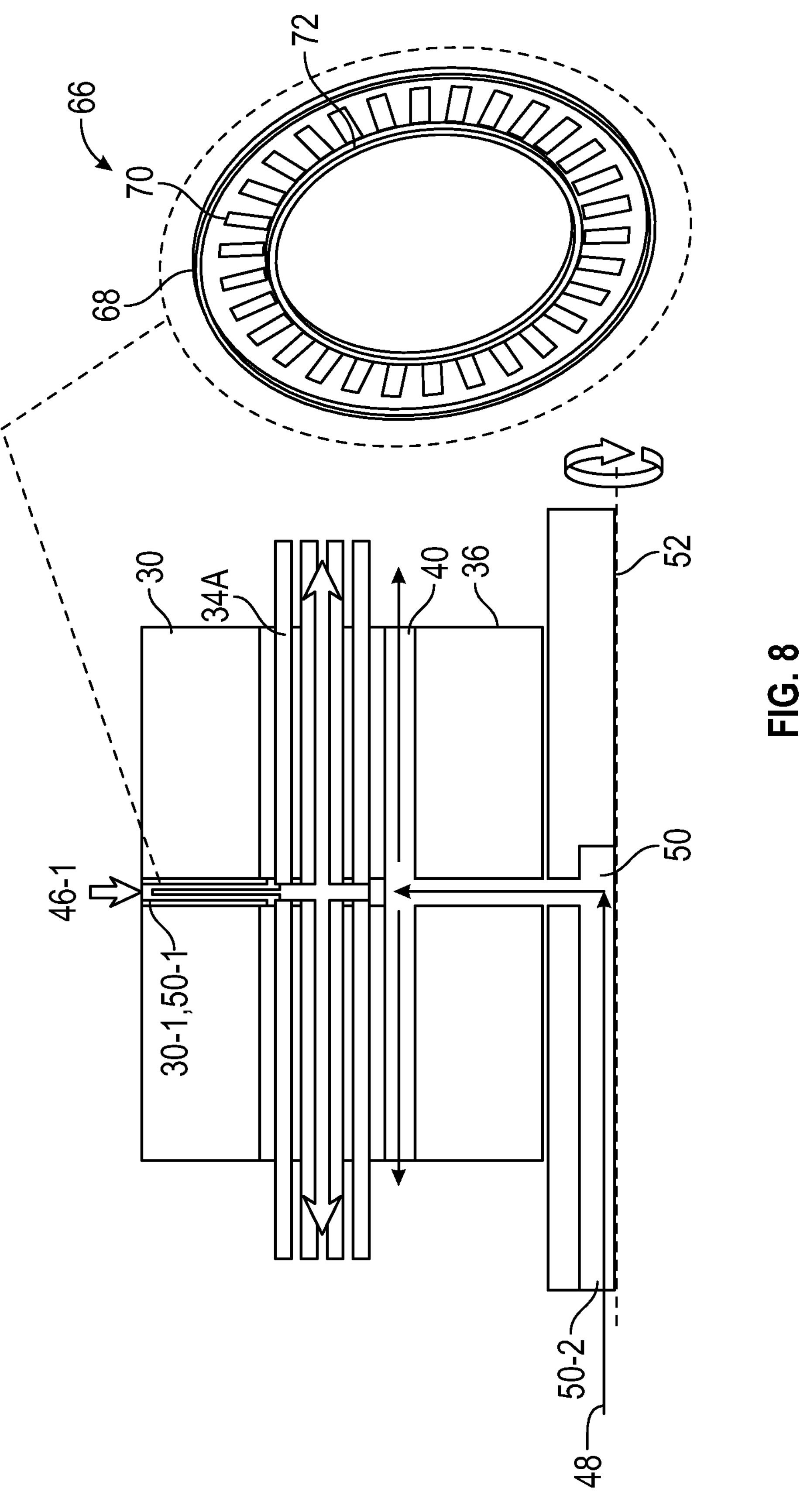
FIG. 8 is a schematic cut-away section illustration of an electric-motor generator including a stator ring, according to another aspect of the disclosure.

According to another aspect of the disclosure, as illustrated in FIG. 8, the first passage 50-1 includes the stator passage 30-1. The rotor shaft 52 defines the at least one second passage 50-2. The first liquid 46-1, for example but not limited to, oil is pumped into the stator passage 30-1, while gas 48, for example but not limited to, air is pumped into the at least one second passage 50-2.

A non-flux carrying stator ring 66 is disposed within the stator passage 30-1. The non-flux carrying materials could include paramagnetic or dielectrics, such as plastics, composites, polymers, or non-ferrous metals including aluminum. The stator ring 66, which includes a feed hole 68, distribution holes 70, and an oil/air dam 72, is operable to facilitate an even distribution of the oil within the electric motor 14.

Figure 9A:
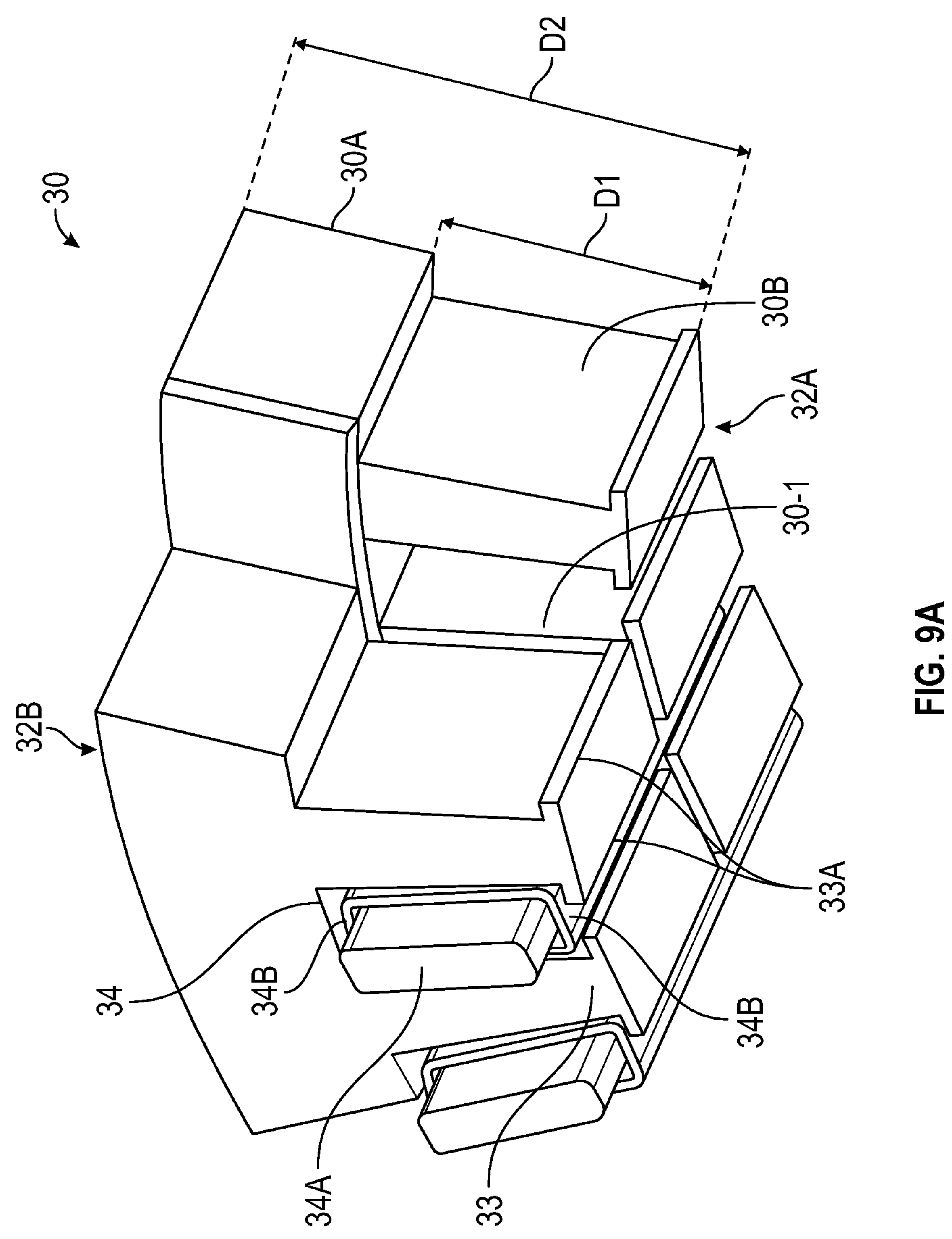
FIG. 9A is an isometric sectional view of a stator, according to one aspect of the disclosure.
Figure 9B:
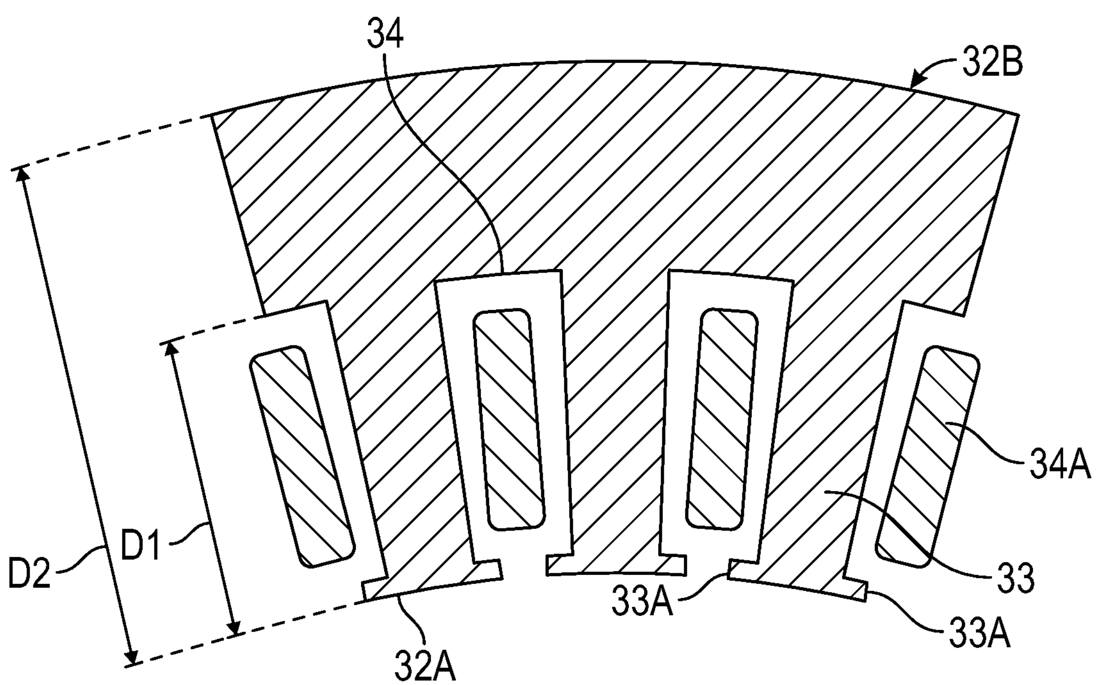
FIG. 9B is a front view of the section of the stator in FIG. 9A, according to one aspect of the disclosure.

Referring now to FIGS. 9A and 9B, an isometric sectional view and a front view of a stator 30 having a ring portion 30A and a channel portion 30B are illustrated. The stator 30 includes stator teeth 33 that alternate with winding slots 34 circumferentially along the channel portion 30B. The stator teeth 33 extend radially the ring portion 30A toward an inner stator core surface 32A a distance $D_1$, and include tips 33A located at the inner stator core surface 32A. Windings 34A are disposed within slot liners 34B, which are disposed within the winding slots 34.

Figure 9C:
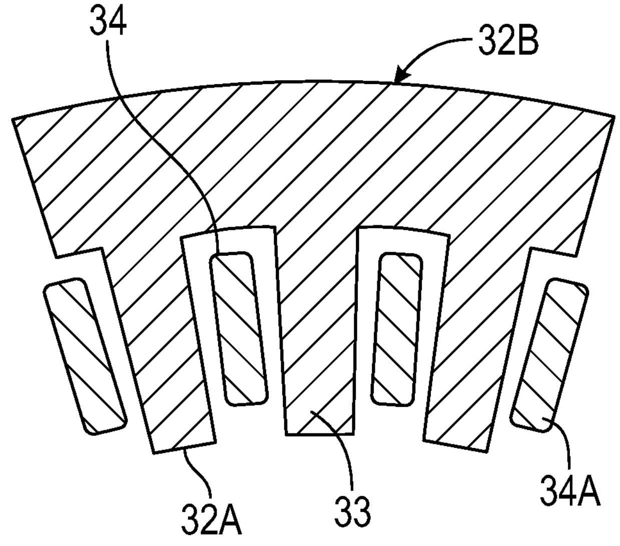
FIG. 9C is a schematic illustration of the stator in FIG. 9A, according to another aspect of the disclosure.
Figure 9D:
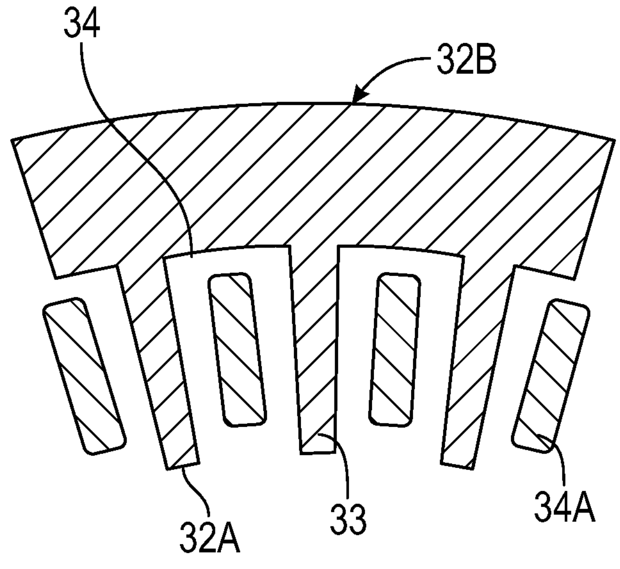
FIG. 9D is a schematic illustration of the stator in FIG. 9A, according to another aspect of the disclosure.
Figure 9E:
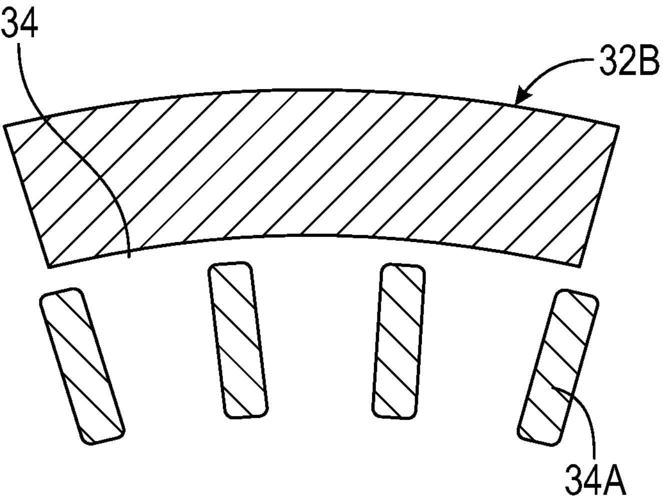
FIG. 9E is a schematic illustration of the stator in FIG. 9A, according to another aspect of the disclosure.

Referring now to FIGS. 9C-9E, stator teeth 30 can be modified or removed within the stator passage 30-1 to promote oil flow from the rotor 36 into the winding slots 34.

As illustrated in FIG. 9C, the tips 33A of the stator teeth 33 within the stator passage 30-1 may be removed to provide additional room for the oil to flow into the winding slots 34. In this example, the stator teeth 33 have a tapered configuration in which each of the stator teeth 33 located within the stator passage 30-1 taper in width from the ring portion 30A to the inner stator core surface 32A.

As illustrated in FIG. 9D, an average width W of the stator teeth 33 within the stator passage 30-1 may be reduced to provide additional room for the oil to flow into the winding slots 34. In this configuration, the average width W of the stator teeth 33 within the stator passage 30-1 is up to 20% less than the stator teeth 33 not within the stator passage 30-1.

As illustrated in FIG. 9E, the stator teeth 33 may be removed all together within the stator passage 30-1 to provide additional room for the oil to flow into the winding slots 34.

Figure 10:
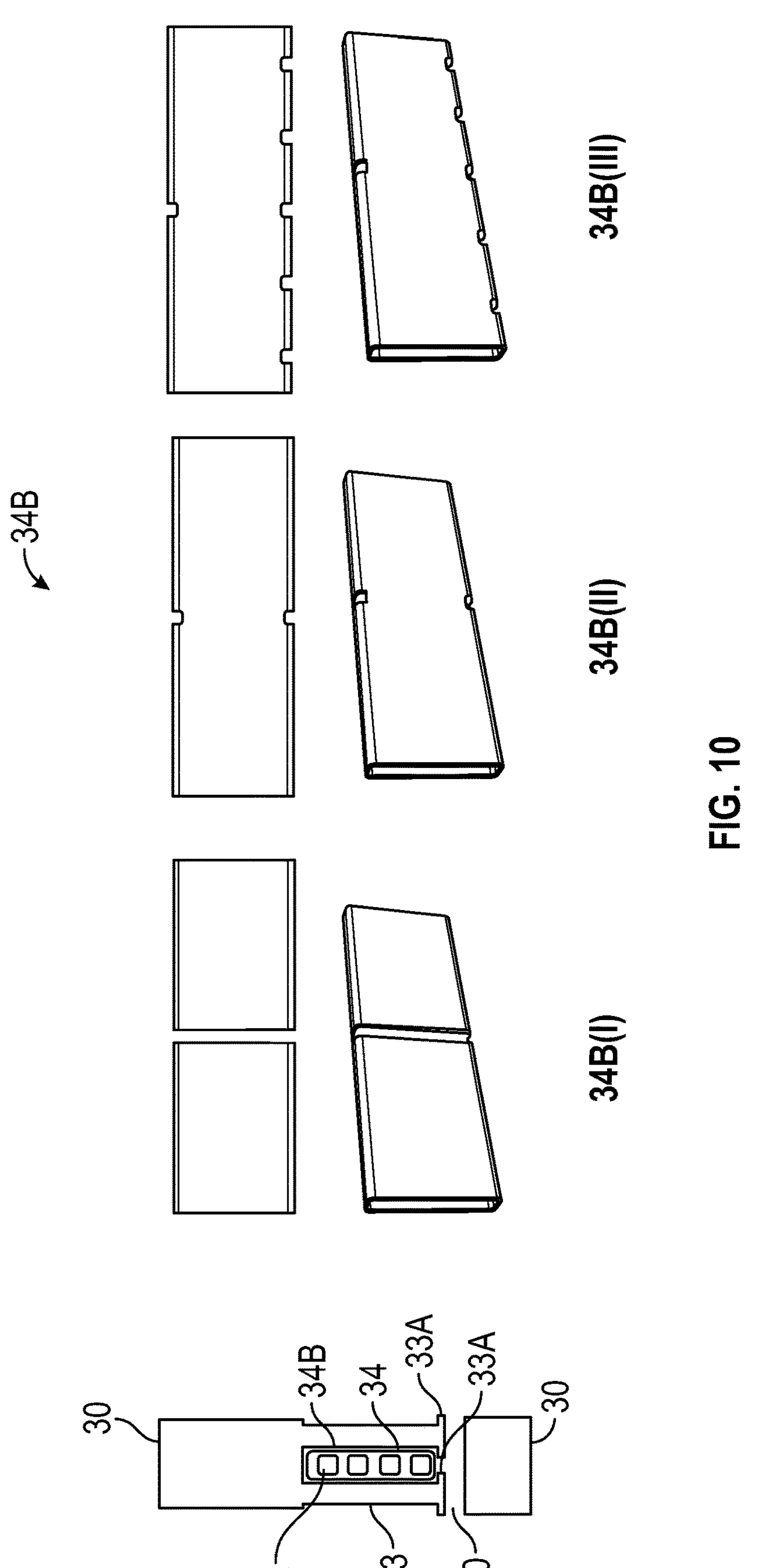
FIG. 10 is a schematic illustration of a stator including a slot liner, according to the disclosure.

Referring now to FIG. 10, the slot liner 34B can include multiple different configurations of cutouts or openings through the slot liner 34B depending on a level of oil desired to enter the slot liner 34B for cooling the windings 34A. In one example, slot liner 34(I) includes a cutout that divides the slot liner 34B (I) into axial halves. In another example, slot liner 34B (II) includes a single cutout along a radially inner edge and a single cutout along a radially outer edge with the single cutouts being located midway between axial ends of the slot liner 34B (II). In yet another example, slot liner 34B (III) includes a single cutout along a radially outer edge and multiple cutouts, such as five cutouts, along a radially inner edge.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An electric motor comprising:

a stator including windings disposed within winding slots, the stator having a radially inner stator core surface and a radially outer stator surface, wherein the stator includes at least one stator passage extending radially a first distance from the radially inner stator core surface;

a rotor mounted inside the stator, defining a rotational axis, and having axially opposite rotor ends and a radially outer rotor surface positioned proximate the radially inner core stator surface, thereby establishing an airgap therebetween, wherein the rotor includes at least one fluid passage extending radially through the rotor to the radially outer rotor surface; and a fluid circulation arrangement configured to receive a first liquid via a first passage and a gas via at least one second passage, and direct the first liquid and the gas, via centrifugal force, into the airgap and the at least one stator passage as the rotor rotates inside the stator to discharge the first liquid and the gas out through the airgap and the at least one stator passage radially, and through the windings axially, thereby cooling the electric motor.

2. The electric motor as recited in claim 1, wherein the at least one stator passage extends a second distance from the radially inner stator core surface to an opening in the radially outer stator surface, the second distance greater than the first distance and the at least one second passage entirely surrounds a portion of the first passage, and a longitudinal axis of each of the first passage and the at least one second passage is aligned with the rotational axis of the rotor.

3. The electric motor as recited in claim 2, wherein the fluid circulation arrangement is configured to receive a second liquid through the opening in the radially outer stator surface via the at least one stator passage.

4. The electric motor as recited in claim 3, wherein the fluid circulation arrangement further includes a rotor shaft positioned coaxially with the rotor, fixed to the rotor, and defining the first passage.

5. The electric motor as recited in claim 4, wherein the rotor shaft defines the at least one second passage.

6. The electric motor as recited in claim 1, wherein the stator further includes stator teeth that extend radially from the radially inner stator core surface and alternate with the winding slots circumferentially along a channel portion of the stator, and wherein the stator teeth within the stator passage have a tapered configuration and a slot liner in each of the winding slots surrounding a corresponding set of windings and the slot liner defines at least one aperture along a radially inner or a radially outer edge of the slot liner.

7. The electric motor as recited in claim 6, wherein the stator teeth within the stator passage are narrower than the stator teeth not within the stator passage.

8. The electric motor as recited in claim 1, wherein the stator further includes stator teeth that extend radially from the radially inner stator core surface and alternate with the winding slots circumferentially along a channel portion of the stator, and wherein the stator teeth within the stator passage are removed.

9. An electric motor comprising:

a stator including windings disposed within winding slots, the stator having a radially inner stator core surface and a radially outer stator surface, wherein the stator includes at least one stator passage extending radially a first distance from the radially inner stator core surface;

a rotor mounted inside the stator, defining a rotational axis, and having axially opposite rotor ends and a radially outer rotor surface positioned proximate the radially inner stator core surface, thereby establishing an airgap therebetween, wherein the rotor includes at least one fluid passage extending radially through the rotor to the radially outer rotor surface; and a fluid circulation arrangement configured to receive a first liquid via a first passage and a gas via at least one second passage, and direct the first liquid and the gas, via centrifugal force, into the airgap and the at least one stator passage as the rotor rotates inside the stator to discharge the first liquid and the gas out through the airgap and the at least one stator passage radially, and through the windings axially, thereby cooling the electric motor;

wherein the fluid circulation arrangement further includes a rotor impeller defining a plurality of fluid channels, and wherein the radially outer rotor surface defines circumferentially distributed apertures fluidly connected to a respective plurality of fluid channels;

the rotor impeller is arranged along the rotational axis centrally within the rotor;

the rotor has a three-piece structure, including a first lateral rotor portion and a second lateral rotor portion, wherein the rotor impeller is disposed adjacent to both the first lateral rotor portion and the second lateral rotor portion.

10. The electric motor of claim 9, wherein the at least one second passage entirely surrounds a portion of the first passage, and a longitudinal axis of each of the first passage and the at least one second passage is aligned with the rotational axis of the rotor.

11. The electric motor as recited in claim 9, wherein the at least one stator passage extends a second distance from the radially inner stator core surface to an opening in the radially outer stator surface, the second distance greater than the first distance.

12. The electric motor as recited in claim 11, wherein the fluid circulation arrangement is configured to receive a second liquid through the opening in the radially outer stator surface via the at least one stator passage.

13. The electric motor as recited in claim 12, wherein the fluid circulation arrangement further includes a rotor shaft positioned coaxially with the rotor, and the rotor shaft is fixed to the rotor with the rotor shaft defining the first passage and the at least one second passage.

14. A motor vehicle comprising:

an electric motor configured to generate torque for propulsion of the motor vehicle, the electric motor including:

a stator including windings disposed within winding slots, the stator having a radially inner stator core surface and a radially outer stator surface, wherein the stator includes at least one stator passage extending radially a first distance from the radially inner stator core surface;

a rotor mounted inside the stator, defining a rotational axis, and having axially opposite rotor ends and a radially outer rotor surface positioned proximate the radially inner stator core surface, thereby establishing an airgap therebetween, wherein the rotor includes at least one fluid passage extending radially through the rotor to the radially outer rotor surface; and a fluid circulation arrangement configured to receive a first liquid via a first passage and a gas via at least one second passage, and direct at least one of the first liquid and the gas, via centrifugal force, into the airgap as the rotor rotates inside the stator to discharge the first liquid and the gas out through the airgap, and through the windings axially, thereby cooling the electric motor.

15. The motor vehicle of claim 14, wherein the fluid circulation arrangement is configured to direct the first liquid and the gas, via centrifugal force, into the airgap as the rotor rotates inside the stator to discharge the first liquid and the gas out through the airgap and the at least one stator passage radially.

16. The motor vehicle as recited in claim 15, wherein the at least one stator passage extends a second distance from the radially inner stator core surface to an opening in the radially outer stator surface, the second distance greater than the first distance.

17. The motor vehicle as recited in claim 16, wherein the fluid circulation arrangement is configured to receive a second liquid through the opening in the radially outer stator surface via the at least one stator passage and the fluid circulation arrangement further includes a rotor shaft positioned coaxially with the rotor, fixed to the rotor, and defining the first passage.

18. The motor vehicle as recited in claim 17, wherein the rotor shaft defines the at least one second passage.

19. The motor vehicle as recited in claim 16, wherein the first passage includes the stator passage, the rotor defines the at least one second passage.

20. The motor vehicle as recited in claim 16, wherein the first passage includes the stator passage, and the at least one second passage is disposed between the rotor, and a rotor shaft positioned coaxially with the rotor, and the rotor shaft is fixed to the rotor.

* * * * *